(No Model.)
R. T. SMITH.
HEDGE FENCE.
No. 418,593. Patented Dec. 31, 1889.
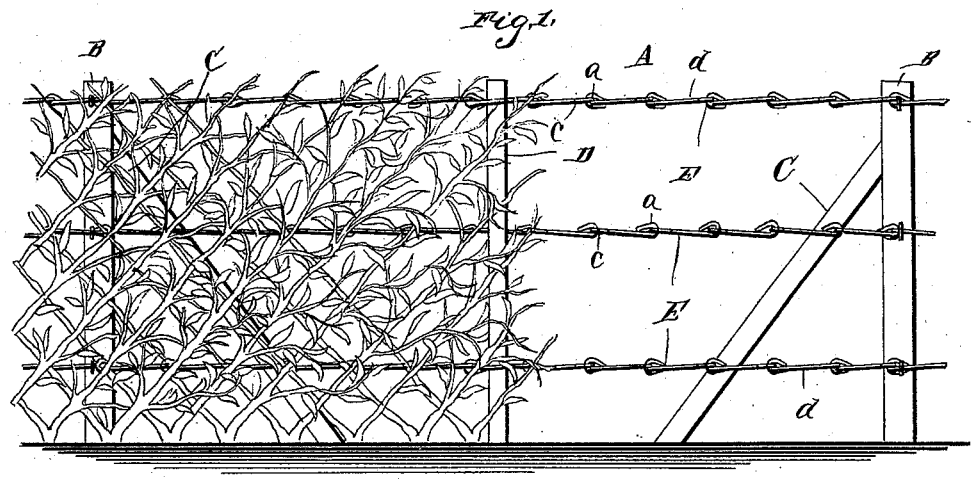
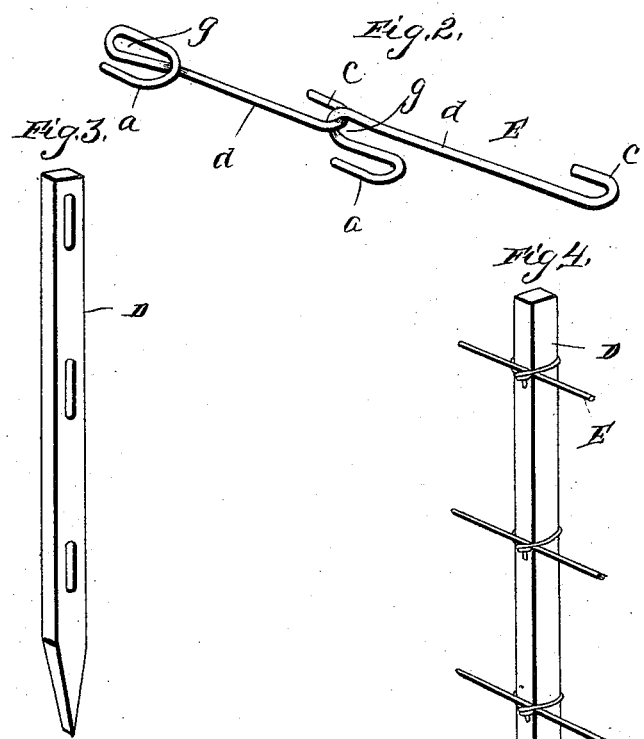
Witnesses
C. L. Taylor
Phil C. Masi.
Inventor
Robert T. Smith
By his Attorney
E. W. Anderson.

UNITED STATES PATENT OFFICE.

ROBERT T. SMITH, OF WESTMINSTER, MARYLAND.

HEDGE FENCE.

SPECIFICATION forming part of Letters Patent No. 418,593, dated December 31, 1889.

Application filed September 30, 1889. Serial No. 325,562. (No model.)

*To all whom it may concern:*

Be it known that I, ROBERT T. SMITH, a citizen of the United States, and a resident of Westminster, in the county of Carroll and State of Maryland, have invented certain new and useful Improvements in Hedges; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a front view of a hedge illustrating the invention. Fig. 2 is a detail view of the links of the training-chain. Figs. 3 and 4 are detail views.

This invention has relation to fences for training plants for hedges; and it consists in the novel construction and combination of parts, as hereinafter described, and pointed out in the appended claims.

The object of the invention is to assist the young plants forming the hedge, in order that they may grow straight, and to protect them from being prostrated by storms until they have acquired sufficient size and strength to mutually support each other by the interlacing of their branches.

In the accompanying drawings, the letter A designates the fence, which is constructed with the wooden posts B, provided with oblique wooden braces C, placed at intervals of about fifty feet. D are removable iron posts or stakes driven into the ground at suitable intervals between the wooden posts B to support the wire chain E, which is composed of wire links $d$, having hooked ends $a$ and $c$ disposed horizontally and secured permanently to the posts B. The iron posts or stakes D are notched or scored transversely to receive wire fastenings for securing the chain thereto, or they may be perforated laterally and the chain run through the perforations, and after the hedge has acquired sufficient growth to dispense with the support of the wire training-chain said stakes may be removed and reserved for future use.

The training-chains E are placed one above another, and consist of links $d$, joined together by their hooked ends $a$ and $c$, respectively. The chains are disposed upon the posts in such a manner that in alternation their hooks shall be oppositely directed, in order that the plant may be trained to bear in one hook $a$ of the first chain in one direction and bent to bear within the oppositely-directed hook $c$ of the chain above, and so on alternately until the last wire or chain is cleared. The number of chains or wires used is not material.

Each chain-link is constructed with a double hook $a$ at one end, or a hook and a loop, and at the opposite end with a single hook $c$, and the single hook $c$ of each link engages the loop of the adjacent link. The hooks of each link lie horizontally in the same plane, but the hook $a$ branches from a lateral loop $g$, which is formed by bending the wire back across the body of the link and returning the same forward to form said hook, as shown. The single hook $c$ is engaged through the loop $g$, and is held in engagement by its approximation to the body of the link. The single hook projects on the side opposite the hook $a$, so that lines of hooks are formed on opposite sides of the chain. This is for the purpose of training a double hedge. When but a single hedge-row is desired, but one set of hooks on one side is used. By means of this device the plants may be trained to grow in any direction, the hooks distributed throughout the fence serving as supporting-guides; but usually they are trained to grow at an angle of about forty-five degrees, crossing each other in opposite directions, so as to cause the branches to interlace and grow together, in this manner forming a practically-impenetrable hedge.

What I claim as new is—

1. In a hedge-training fence, the wire chain secured at intervals to permanent posts and comprising links each having at one end a single hook and at its opposite end a combined or continuous hook and loop, said hook arranged horizontally and on opposite sides, and the loop standing vertically, substantially as set forth.

2. The hedge-training fence, consisting of the permanent posts, the wire chain secured to said posts, and the removable supports or stakes, said chain comprising links each having at one end a single hook and at its opposite end a combined or continuous hook and loop, said hooks arranged horizontally and on opposite sides, and the loop standing vertically, substantially as set forth.

In testimony whereof I affix my signature in presence of two witnesses.

ROBERT T. SMITH.

Witnesses:
G. E. BAUGHMAN,
HUGO E. FIDDIS.